(12) United States Patent
Lawless, III et al.

(10) Patent No.: US 10,894,349 B2
(45) Date of Patent: Jan. 19, 2021

(54) METHOD FOR CONTROLLING VALVE GATES USING ONE OR MORE STRAIN GAUGES

(71) Applicant: IMFLUX INC., Hamilton, OH (US)

(72) Inventors: William Francis Lawless, III, Medford, MA (US); Chow-Chi Huang, West Chester, OH (US); Gene Michael Altonen, Hamilton, OH (US); Brandon Michael Birchmeier, Morrow, OH (US)

(73) Assignee: IMFLUX INC., Hamilton, OH (US)

( * ) Notice: Subject to any disclaimer, the term of this patent is extended or adjusted under 35 U.S.C. 154(b) by 510 days.

(21) Appl. No.: 15/816,457

(22) Filed: Nov. 17, 2017

(65) Prior Publication Data

US 2018/0141252 A1   May 24, 2018

Related U.S. Application Data

(60) Provisional application No. 62/423,977, filed on Nov. 18, 2016.

(51) Int. Cl.
*B29C 45/76* (2006.01)
*B29C 45/77* (2006.01)
(Continued)

(52) U.S. Cl.
CPC ........ *B29C 45/762* (2013.01); *B29C 45/0025* (2013.01); *B29C 45/281* (2013.01);
(Continued)

(58) Field of Classification Search
CPC ..... B29C 45/762; B29C 45/77; B29C 45/766; B29C 2945/76943; B29C 2945/76933
See application file for complete search history.

(56) References Cited

U.S. PATENT DOCUMENTS

| 4,889,667 A | * | 12/1989 | Kojima | .................. B29O 45/77 264/40.1 |
| 5,556,582 A | | 9/1996 | Kazmer | |

(Continued)

FOREIGN PATENT DOCUMENTS

WO    WO-2015066004 A1    5/2015

OTHER PUBLICATIONS

International Search Report and Written Opinion for Application No. PCT/US2017/062252, dated Feb. 1, 2018.

*Primary Examiner* — Galen H Hauth
(74) *Attorney, Agent, or Firm* — Marshall, Gerstein & Borun LLP (57) ABSTRACT

A method of monitoring and controlling a sequential valve gate molding apparatus in an injection molding or other molding process is disclosed. The method includes creating a target strain profile, receiving a deviation limit, receiving a change in strain relating to a first valve gate from a first strain gauge, identifying whether a deviation exists from a first portion of the target strain profile based on the output from the first strain gauge, determining whether any existing deviation exceeds the deviation limit, and adjusting the position of a first valve gate pin in the first valve gate if it does. The method may further include control of subsequent valve gates. Multiple strain gauges may be used to control a single valve gate, and/or each strain gauge may control more than one valve gate.

29 Claims, 8 Drawing Sheets

(51) Int. Cl.
*B29C 45/00* (2006.01)
*B29C 45/28* (2006.01)

(52) U.S. Cl.
CPC ............ *B29C 45/76* (2013.01); *B29C 45/766* (2013.01); *B29C 45/7613* (2013.01); *B29C 45/77* (2013.01); *B29C 2045/0032* (2013.01); *B29C 2045/2824* (2013.01); *B29C 2945/7604* (2013.01); *B29C 2945/76006* (2013.01); *B29C 2945/76013* (2013.01); *B29C 2945/76254* (2013.01); *B29C 2945/76267* (2013.01); *B29C 2945/76381* (2013.01); *B29C 2945/76481* (2013.01); *B29C 2945/76568* (2013.01); *B29C 2945/76665* (2013.01); *B29C 2945/76752* (2013.01); *B29C 2945/76755* (2013.01); *B29C 2945/76859* (2013.01); *B29C 2945/76936* (2013.01); *B29C 2945/76943* (2013.01)

(56) References Cited

U.S. PATENT DOCUMENTS

| | | | |
|---|---|---|---|
| 6,056,902 A | | 5/2000 | Hettinga |
| 6,464,909 B1 * | | 10/2002 | Kazmer ............... B29C 45/2806 264/40.1 |
| 6,514,440 B1 | | 2/2003 | Kazmer et al. |
| 2016/0263801 A1 | | 9/2016 | Zigante et al. |

* cited by examiner

METHOD FOR CONTROLLING VALVE GATES USING ONE OR MORE STRAIN GAUGES

CROSS REFERENCE TO RELATED APPLICATIONS

This application is a non-provisional and claims the benefit of the filing date of U.S. Provisional Patent Application No. 62/423,977, filed Nov. 18, 2016, entitled "Method for Controlling Valve Gates Using one or More Strain Gauges." The entire contents of U.S. Provisional Application No. 62/423,977 is hereby incorporated by reference.

FIELD OF THE DISCLOSURE

This application relates generally to injection molding and, more specifically, to a method of controlling the opening and closing of individual valve gates in an injection molding process using values from strain gauges. In particular, this application relates to identifying a difference in a measured parameter, such as strain, in regions of a mold cavity during an injection molding process and opening or closing a valve gate in response to that difference in order to achieve even flow of molten plastic throughout the cavity.

BACKGROUND

At the start of an injection molding process, thermoplastic pellets are fed by a hopper into a heated barrel and driven to the end of the heated barrel by a reciprocating screw. The thermoplastic pellets melt into a molten thermoplastic material, and shots of thermoplastic material are injected through a nozzle. The molten thermoplastic material then flows through either a cold runner or a hot runner to the valve gates of each individual cavity of a mold. Each individual cavity may have one or more than one valve gate. After entering the valve gate or valve gates, the molten thermoplastic material fills a mold cavity formed between two or more sides of the mold held together under pressure by a press or clamping unit. Once the shot of molten thermoplastic material is injected into the mold cavity, the reciprocating screw stops traveling forward. The molten thermoplastic material takes the form of the mold cavity and cools inside the mold until it solidifies. Then the clamping unit releases the mold sides and the finished part is ejected from the mold.

The injection molding process may vary depending on the type of injection molding being performed. For example, traditional injection molding machines inject the molten thermoplastic material at very high pressures, typically greater than 15,000 psi, for a first period of time, and thereafter hold the pressure for a second period of time at a lower but still relatively high pressure of 10,000 psi or more. More recently, constant low pressure multi-cavity injection molding systems have been developed that inject the molten plastic material into the mold cavity at a substantially constant low pressure, typically less than 6,000 psi, for a single time period. Other injection molding processes include metal injection molding (MIM), reaction injection molding (RIM), and liquid injection molding (LIM).

Whatever the type of injection molding process being carried out, monitoring of the process over time is desirable in order to identify and correct any problems as soon as possible. For example, the pressure within a mold cavity is an important parameter to monitor, as insufficient pressure may result in improperly formed parts while excessive pressure may result in damage to the mold. One particular motivation to monitor flow front position and/or control internal pressure at certain times during the short duration of filling of a mold cavity is to account for flow filling challenges.

The term "flow filling challenge" is defined as a region of a part of a mold that forms a feature of a part to be molded which is particularly susceptible to any one or more of a number of problems that complicate the molding of the part or render the molded part more likely to suffer from one or more defects or reduced mechanical properties, such as short-fills, warp, sinks, brittleness, flash, voids, non-fills, weakness (e.g., low tensile, torsional, and/or hoop strength), high stress concentrations, low modulus, reduced resistance to chemical exposure, premature fatigue, non-uniform shrinkage, and discontinuities in color, surface texture, opacity, translucency, or transparency. Non-exhaustive examples of flow filling challenges are: locations in a mold used to form ribs, bosses, or corners, as well as obstacles in a mold (such as core pins), and transitions (such as a change in thickness of a part to be molded, which may be a sudden stepped change in thickness or a gradual change in thickness, such as a tapered region). These can involve a transition from a relatively thick region to a relatively thin region, and then back to a relatively thick region, and may involve one or more changes in thickness. The portion of a mold cavity used to form a living hinge, which is typically an integral, relatively thin region of a molded part that permits one portion of the part, such as a flip-top of a cap, to rotate with respect to the rest of the part, also poses a flow filling challenge. As the term flow filling challenge is used herein, it is contemplated that the region of the part affected by a particular challenge may be at a particular position of a mold cavity, along a region of a mold cavity, or downstream of a particular position or region of a mold cavity, and as such, a flow filling challenge need not be limited to a particular location of a change in shape of a mold cavity, but may extend beyond, i.e. downstream of, such a location.

To address flow filling challenges, valve gate systems are sometimes designed so that individual valve gates within a given system can open or close in a predetermined sequence based on one or more factors. This is commonly referred to as a sequential valve gate system. Sequential valve gate systems are typically used for molding large parts that require more than one gate to fill the entire cavity forming the part, smaller parts with very complex geometries, or in multi-cavity molds in which the individual parts vary in size, shape or volume. The advantages of a sequential valve gate system include, but are not limited to, lower molded-in stress in parts formed in the sequential valve gate system, lower clamping tonnage requirements, and reduction or elimination of weld lines. This increases part quality as well as reduces wear and tear on the mold. Sequential valve gate systems may also be used in applications in which there are one or more materials being injected into a mold, such as a multiple shot over-molding process or a co-injection process in which a recycled material is injected inside another material.

In a sequential valve gate molding system, the method of control to open or close the individual valve gates relies on parameters relating to either: (1) time, or (2) the position of the injection molding screw as it relates to the injected volume of molten thermoplastic material relative to the total volume of molten thermoplastic material of the injection molding shot. In addition to time and screw position, the method of control to open or close individual valve gates relies upon an approximation of the melt pressure for a particular region of a single part or a particular part in a group of dissimilar parts. Mechanically, the method for opening or closing valve gates typically involves either: (1) activating pneumatic valves to direct compressed air to move a piston to an open or closed position, or (2) using a servo motor to move a piston to an open or closed position. The control system usually only recognizes two states for a piston: a fully open state and a fully closed state. However, some control systems recognize a single intermediate position between a fully open state and a fully closed state, and some control systems provide variable position control of the piston. One of the complications that can occur when using pneumatic valves to direct compressed air to move a piston is that there is no direct feedback from the valve gate system to confirm that piston has arrived at an open or closed position or moved at all.

Ideally, sensors for monitoring an injection molding process, such as sensors for monitoring the position of valve gates, would be indirect, easy to install, and inexpensive. Direct sensors, such as sensors placed within a mold cavity, leave undesirable marks on part surfaces. For example, while demand for injection molded parts with high gloss finishes has been increasing, direct sensors positioned in the mold cavity have a tendency to mar the high gloss finish of the parts, requiring post-molding operations to machine or otherwise mask or remove the marred regions from the parts. As a result, indirect sensors that are not located in the mold cavity are preferable. Additionally, when the molding system is being used to make products for medical applications, contact between a sensor and the thermoplastic material may be prohibited.

Recently, strain gauges have been placed on a mold surface, within a nozzle adapter, or elsewhere within an injection molding apparatus, in order to measure how strain at the measured location changes over the course of a standard injection molding process. For example, a strain gauge sensor placed on the exterior of the mold surface adjacent to a parting line of a mold, as described in co-owned U.S. patent application Ser. No. 62/303,654, "External Sensor Kit for Injection Molding Apparatus and Methods of Use," the entirety of which is hereby incorporated by reference, is able to sense the surface strain changes on the mold surface that occur over time as a result of the closing and opening forces. In response to surface strain changes, the strain gauge sensor emits an electrical signal, typically in the range of −10 to 10 Volts. The signal emitted by the strain gauge sensor is received and used by a controller to approximate one or more conditions within the mold, such as the pressure within the mold cavity or the location of the melt flow front. In certain molds in which the ratio of the length of the flow channel to the thickness of the molded part is great, i.e. molds having a high length-to-thickness (L/t) ratio, the pressure at the melt flow front may be approximated based on the signals emitted by the strain gauge sensor(s).

Control of an injection molding system generally using strain gauge measurements is disclosed in U.S. patent application Ser. No. 62/356,643, "Method for Monitoring and Controlling an Injection Molding Process Using a Strain Gauge", the entirety of which is hereby incorporated by reference. As described therein, throughout an injection molding process, the mold experiences changes in strain. The strain experienced by a mold may differ depending on what type of injection molding process is being used. A strain profile can be developed that identifies target strain changes that should be occurring at each step in an injection molding process. Once a strain profile has been developed for a molding system, deviations from the target strain profile can be identified and used to take corrective action. Process variables, such as measured strain, can be compared to reference values used to make the strain profile. An upper and lower acceptable deviation limit may be set for each reference value and may be adjusted if desirable. The ability to set or adjust a reference value or the upper and lower acceptable deviation limit may be limited to system administrators. Because temperature impacts strain, temperature data provided from a location near the strain sensor should always be taken into consideration when calculating deviations from a target strain profile.

SUMMARY

Embodiments within the scope of the present disclosure are directed to using parameters provided by an external sensor to control the opening and closing of valve gates in an molding system, particularly in a sequential valve gate molding system. A sequential valve gate molding system may be used in an injection molding process, which is the primary process discussed herein. However, a sequential valve gate molding system may alternately be used in other molding processes, such as a substantially constant pressure injection molding process, an injection-blow molding process, a metal injection molding (MIM) process, a reaction injection molding (RIM) process, a liquid injection molding (LIM) process, a structural foam molding process, a liquid crystal polymer (LCP) molding process, and an injection-stretch blow molding process. Strain gauge sensors are the type of sensor primarily discussed, while other sensors capable of detecting movement of steel as a proxy or tell-tale for internal conditions such as melt pressure, could achieve the same purpose as a strain gauge sensor and are within the scope of the present disclosure. For example, microwave sensor kits, x-ray sensor kits, ultrasonic sensor kits, air pressure sensor kits, air temperature sensor kits, and sub-surface temperature sensor kits, could all be substituted for the strain gauge sensors described and depicted below. Additionally, other types of external gauge sensors, such as electrical, electronic, mechanical, wireless, and fiber optic sensors, could be utilized instead of strain gauge sensors.

Strain gauge sensors used to control the opening and closing of valve gates could be placed on an outside surface of a mold or a mold plate. Alternately, stain gauge pins could be installed on a cavity block outside the molding surface. Strain gauge sensors located on mold surfaces and within cavity blocks outside a mold cavity are primarily discussed below, while strain gauge sensors located in other locations within an injection molding apparatus could achieve the same purposes. Strain gauge measurements provided to a controller of an injection molding system can be used to optimize the opening and closing of valve gates better than is possible using time or screw positions for control because strain gauge measurements provide a more accurate estimation of melt pressure within an injection molding system. Measurements provided by strain gage sensors may be used by a controller to provide a more consistent delivery of melt to multiple regions of a single large part, a single complex part, or for multiple cavity molds in which the individual parts vary in size, shape or volume.

A method of monitoring and controlling a sequential valve gate molding apparatus may include creating, by one or more processors, a target strain profile for a sequential valve gate molding process of a sequential valve gate molding apparatus, wherein the target strain profile has at least a first portion relating to opening of a first valve gate.

The method may include receiving, via an interface, an upper deviation limit and a lower deviation limit for the sequential valve gate molding process and then receiving, as an output from a first strain gauge, a change in strain in the sequential valve gate molding apparatus relating to the first valve gate. The method may include identifying, by the one or more processors, whether a deviation from the first portion of the target strain profile exists based on the sensed change in strain provided as the output from the first strain gauge. When a deviation from the first portion exists, the method may include comparing, by the one or more processors, the deviation from the first portion to the upper deviation limit or the lower deviation limit. When the deviation from the first portion exceeds the upper deviation limit or the lower deviation limit, the method may include adjusting a position of a first valve gate piston, thereby adjusting the position of a first valve gate pin in the first valve gate.

Additionally, the method may include creating, by one or more processors, a second portion of the target strain profile relating to opening of a second valve gate. The method may include receiving, as an output from a second strain gauge, a change in strain in the sequential valve gate molding apparatus relating to the second valve gate. The method may further include identifying, by the one or more processors, whether a deviation from the second portion of the target strain profile exists based on the sensed change in strain provided as the output from the second strain gauge. When a deviation from the second portion exists, the method may include comparing, by the one or more processors, the deviation from the second portion to the upper deviation limit or the lower deviation limit. When the deviation from the second portion exceeds the upper deviation limit or the lower deviation limit, the method may include adjusting a flow of air through at least one of an opening pathway and a closing pathway to adjust a position of a second valve gate piston and thereby adjust the position of a second valve gate pin in the second valve gate.

More than one strain gauge may be used to control each valve gate. For example, the method may include receiving, as an output from a supplemental strain gauge, a supplemental change in strain in the sequential valve gate molding apparatus relating to the first valve gate, and identifying, by the one or more processors, whether the deviation from the first portion of the target strain profile exists based on the sensed change in strain provided as the output from the first strain gauge and the supplemental sensed change in strain provided by the as the output from the supplemental strain gauge.

Further, each strain gauge may be used to control more than one valve gate. For example, the method may include receiving, as an output from the second strain gauge, a supplemental change in strain in the sequential valve gate molding apparatus relating to the first valve gate. The method may then include identifying, by the one or more processors, whether the deviation from the first portion of the target strain profile exists based on the sensed change in strain provided as the output from the first strain gauge and the supplemental sensed change in strain provided as the output from the second strain gauge.

Strain gage measurements can be used to determine whether a valve gate is open, closed, or somewhere in between by comparing the obtained strain profile with a target strain profile for a valve gate in a certain region or position. The method may include determining the position of the first valve gate pin based on a comparison of the sensed change in strain provided as the output from the first strain gauge to the first portion of the target strain profile. This method works with strain gauge applications in which only open and closed positions of a valve gate are recognized, where a single intermediate position is also recognized, or where complete variable control is possible. Adjusting the position of a gate piston, thereby adjusting the position of the respective valve gate pin in the valve gate, may include adjusting a flow of air through at least one of an opening pathway and a closing pathway. Alternately, adjusting the position of a gate piston, thereby adjusting the position of the respective valve gate pin in the valve gate, may include adjusting output by a servomotor.

The method of monitoring and controlling a sequential valve gate molding apparatus may be provided in a non-transitory computer-readable medium storing processor-executable instructions. Additionally, the method may be provided on a client device comprising one or more processors, one or more interfaces, and non-transitory computer-readable medium storing processor-executable instructions.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
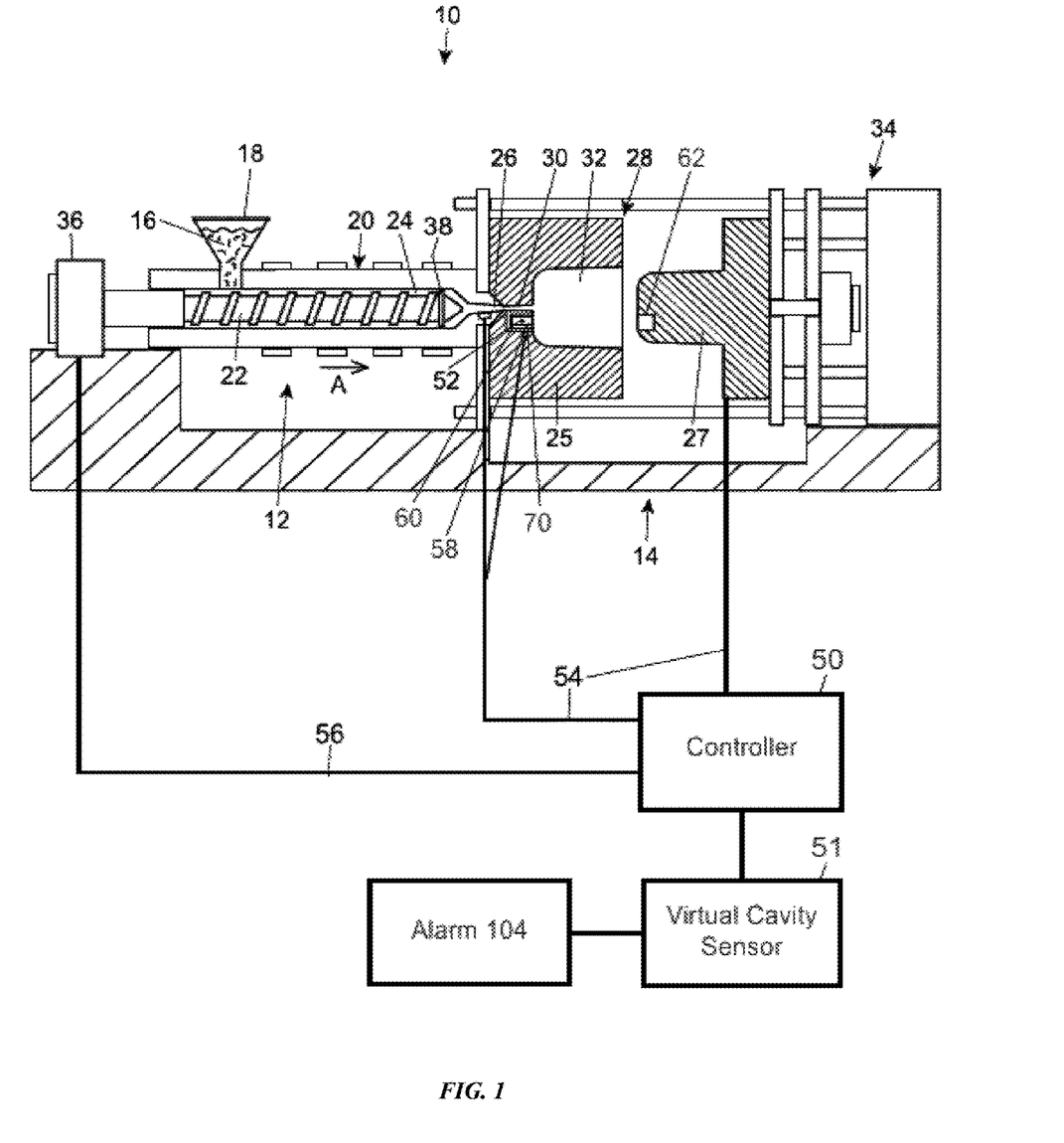
FIG. 1 illustrates, semi-schematically, a conventional injection molding apparatus, wherein a first portion of strain gauge sensor assembly containing a strain gauge is placed adjacent to a first mold side in the vicinity of the nozzle to the mold cavity and a second portion of the strain gauge sensor assembly is placed on a second mold side downstream of the nozzle and is configured to contact the first portion of the strain gauge sensor assembly when the mold is in a closed position.

Referring to the figures in detail, FIG. 1 illustrates an exemplary injection molding apparatus 10 for producing thermoplastic parts in high volumes (e.g., a class 101 injection mold, or an "ultra-high productivity mold", a class 102 (medium-to-high productivity mold), or class 103 (a medium productivity mold)). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a ram, such as a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24 toward a nozzle 26 to form a shot of thermoplastic material, which will be injected into a mold cavity 32 of a mold 28 via one or more gates. The molten thermoplastic material 24 may be injected through a gate 30, which directs the flow of the molten thermoplastic material 24 to the mold cavity 32. In some instances, more than one gate 30 may be provided per mold cavity 32. The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a strain gauge sensor 52, a screw control 36, and a temperature sensor 70. The strain gauge 52 may be located on a first portion of a strain gauge assembly 58, which is secured to the exterior surface of a first mold side 25 near the parting line between the first mold side 25 and the second mold side 27 and in the vicinity of the nozzle 26. In other embodiments within the scope of the present disclosure, the strain gauge 52 may be located directly on the mold 28 or in another location in the injection molding apparatus 10 altogether. The temperature sensor 70 is located near the strain gauge 52. The controller 50 may include a microprocessor (or another suitable processing unit, or several such units), a non-transitory memory, and one or more communication links.

Figure 1A:
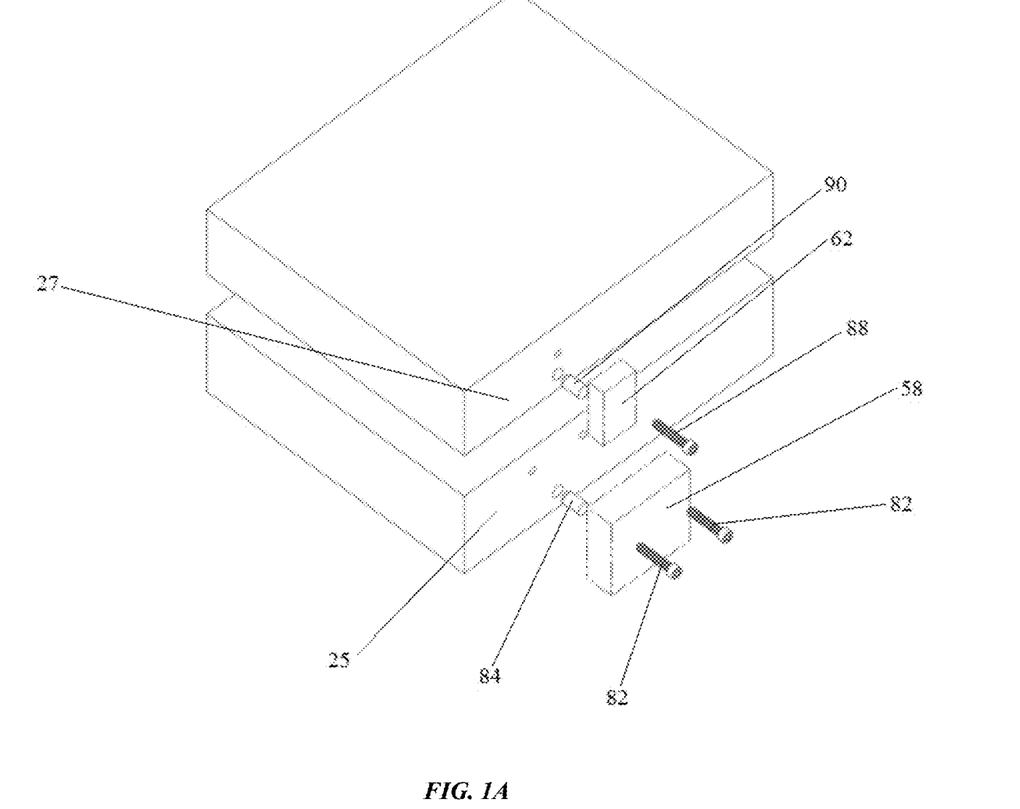
FIG. 1A illustrates an enlarged perspective view of the first and second portions of the strain gauge sensor assembly depicted in FIG. 1.

In some embodiments, as shown in FIG. 1A, the first mold side 25 has holes drilled therein. A first portion of a strain gauge sensor assembly 58 is secured to the first mold side 25 by bolts 82 that are inserted through the first portion of the strain gauge sensor assembly and into the first mold side 25 and by a peg 84 which is inserted partially into the first portion of a strain gauge sensor assembly 58 and partially into a hole in the first mold side 25. The second mold side 27 has holes drilled into it, and second portion of the strain gauge sensor assembly 62 is secured to the second mold side 27 by a bolt 88 that is inserted through the second portion of the strain gauge sensor assembly 62 into the second mold side 27 and by a peg 90 which is inserted partially into the second portion of the strain gauge sensor assembly 62 and partially into a hole in the second mold side 27. A side of the second portion of the strain gauge sensor assembly 62 is aligned with the parting line of the mold 28 along an edge of second mold side 27 and is configured to contact the first portion of the strain gauge sensor assembly 58 when the mold 28 is closed.

Data from the strain gauge sensor 52 and the temperature sensor 70 may be communicated to a processor that calculates a change in strain. Electric signals from the strain gauge sensor 52 and temperature sensor 70 may travel along one or more electrical paths, such as wires 54, depicted in FIG. 1 in solid lines, ranging in strength from −10 to 10 Volts. The controller 50 may be connected to the screw control 36 via wired connection 56. In other embodiments, the controller 50 may be connected to the screw control 36 via a wireless connection, a mechanical connection, a hydraulic connection, a pneumatic connection, or any other type of communication connection known to those having ordinary skill in the art that will allow the controller 50 to communicate with the screw control 36.

Additionally, the controller 50 is in communication with a virtual cavity sensor 51, which is implemented as a program, or a set of software instructions. In this disclosure, the term "virtual cavity sensor" can refer to a module that determines the value of a process variable, such as pressure, without directly measuring this process variable. The strain gauge sensor 52, the temperature sensor 70, and the virtual cavity sensor 51 together form a pressure controlling system that generates data relevant to strategic controlling of the pressure within the mold cavity 32. As used herein, the term "pressure controlling system" refers to any suitable group of components, which can include both software-implemented and hardware-implemented components, that generate a signal indicative of a condition within a mold cavity based on a signal indicative of another process variable. The virtual cavity sensor 51, in short, strives to achieve a target strain profile in the injection molding apparatus 10 over time. In some instances, the virtual cavity sensor 51 in conjunction with the controller 50 is able to achieve the target strain profile on its own. In some instances, problems may arise that cannot be corrected by the virtual cavity sensor 51 in conjunction with the controller 50. In such an instance, the virtual cavity sensor 51 activates an alarm 104. The alarm 104 may be a visual alarm, such as a flashing light or a pop-up window on a computer screen, or may be an audible alert such as a beeping sound or siren, or may be both visual and audible.

Figure 2:
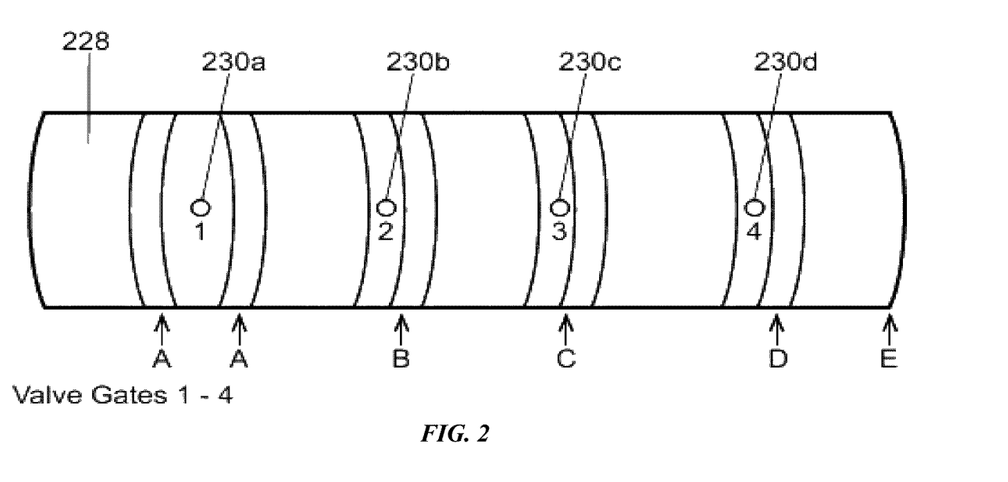
FIG. 2 is an overhead view of sequential valve gate injection molding system.

FIG. 2 illustrates a top view of a mold 228 of a sequential valve gate molding apparatus 200, which could be used in a system similar to that depicted in FIGS. 1 and 1A. Alternately, the mold 228 could be used in other molding systems, such as a substantially constant pressure injection molding process, an injection-blow molding process, a metal injection molding (MIM) process, a reaction injection molding (RIM) process, a liquid injection molding (LIM) process, a structural foam molding process, a liquid crystal polymer (LCP) molding process, and an injection-stretch blow molding process. The mold 228 has four gates, 230a, 230b, 230c, and 230d that allow thermoplastic material to be injected into the mold cavity of the mold 228. Gate 230a is opened first, with the remainder of the gates 230b, 230c, and 230d opened in order as the melt flow front reaches their respective positions.

Figure 3:
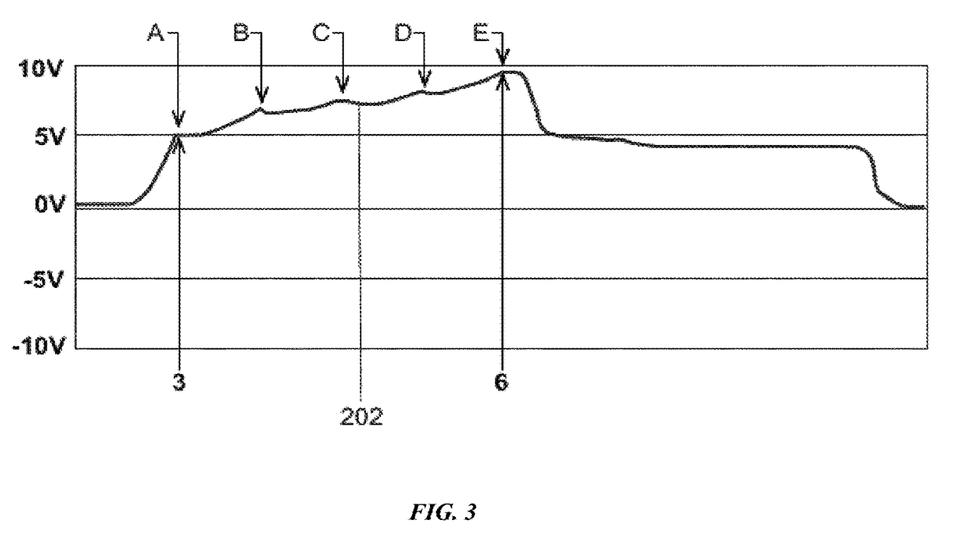
FIG. 3 is an exemplary target strain profile for filling the sequential valve gate molding system depicted in FIG. 1.

FIG. 3 provides a target strain profile 202 for the sequential valve gate molding apparatus 200 as each of the valve gates is opened to permit molten thermoplastic material to flow into the mold. Throughout the time range for the target strain profile 202, injection molding steps are occurring. These steps contribute to the change in strain between start line S and end line E. Specifically, the clamp tonnage set-point for securing mold sides together is reached, and the change in strain in the mold becomes zero. After that, the mold experiences a moderate change in strain as molten thermoplastic material begins to enter and fill the mold. Next, the mold experiences a significant change in strain as the end of the fill approaches and the molten thermoplastic material is more tightly packed into the mold. By the end line E, the increase in pressure resulting from the final filling of the mold cavity is balanced by the reduction in pressure resulting from the previously injected thermoplastic material beginning to cool and shrink so little to no change in strain is experienced. A notable change in strain occurs with the opening of each gate 230a, 230b, 230c, and 230d, which corresponds with points A, B, C, and D respectively on the target strain profile 202 depicted in FIG. 3.

Figure 4:
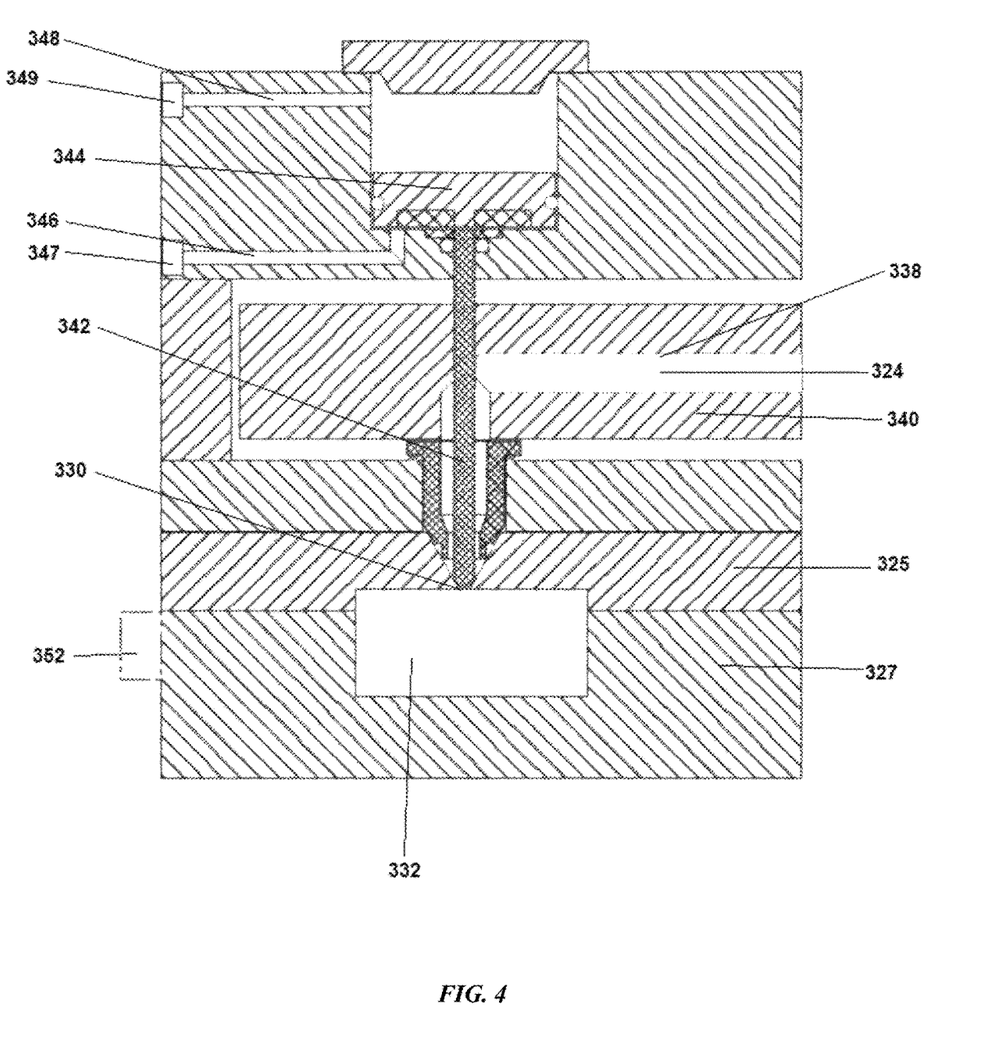
FIG. 4 is a cross-sectional view of a pneumatically-operated valve gate in a molding system incorporating a strain gauge.

As illustrated in FIG. 4, a mold cavity 332 is provided between a first mold side 325 that is stationary and a second mold side 327 that is mobile. Molten polymeric material 324 flows into the mold cavity 332 through a hot runner 338 in a hot runner manifold 340. A valve gate 330 is alternately opened and closed to selectively permit and prevent flow of the molten polymeric material 324 into the mold cavity 332. The opening and closing of the valve gate 330 is achieved by a valve pin 342, which is acted upon by a valve piston 344. The valve piston 344 is actuated by compressed air, which moves through a pathway 346 to open the valve piston 344 and through a pathway 348 to close the valve piston. A valve 347 and 349 is provided in each of pathways 346 and 348 to control the flow of the compressed air, thereby controlling movement of the valve piston 344. A strain sensor 352 is provided on an outer surface of the second mold side 327 for sensing changes in strain occurring as the mold cavity 332 is filled with molten polymeric material 324. The strain sensor 352 could alternately be a strain pin installed on a cavity block.

Figure 5:
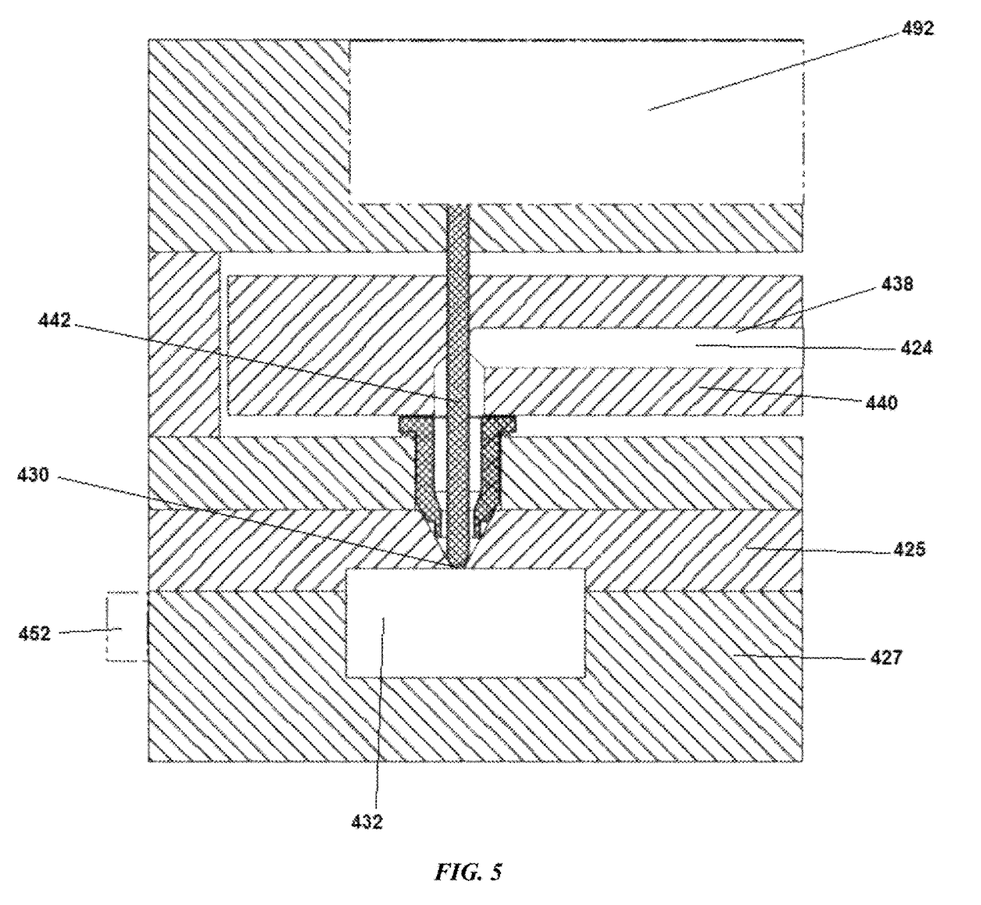
FIG. 5 is a cross-sectional view of a servomotor-operated valve gate in a molding system incorporating a strain gauge.

In FIG. 5, as in FIG. 4, a mold cavity 432 is provided between a first mold side 425 that is stationary and a second mold side 427 that is mobile. Molten polymeric material 424 flows into the mold cavity 432 through a hot runner 438 in the hot runner manifold 440. A valve gate 430 is alternately opened and closed to selectively permit and prevent flow of the molten polymeric material 424 into the mold cavity 432. The opening and closing of the valve gate is achieved by a valve pin 442, which is acted upon by a valve piston 444. However, in FIG. 5, the valve piston 444 is actuated by a servomotor system 492 (as opposed to compressed air, as in the embodiment described above with respect to FIG. 4). The servomotor system may include a gearmotor per valve or a set of closely-pitched valves, a gearbox per valve or a set of closely pitched valves and a belt that drives the entire set of gearboxes or sub-sets, a rack and a pinion that drives multiple valves, or solenoids or individual valves. As in FIG. 4, a strain sensor 452 is provided on an outer surface of the second mold side 426 for sensing changes in strain occurring as the mold cavity 432 is filled with molten polymeric material 424. The strain sensor 452 could alternately be a strain pin installed on a cavity block.

Figure 6:
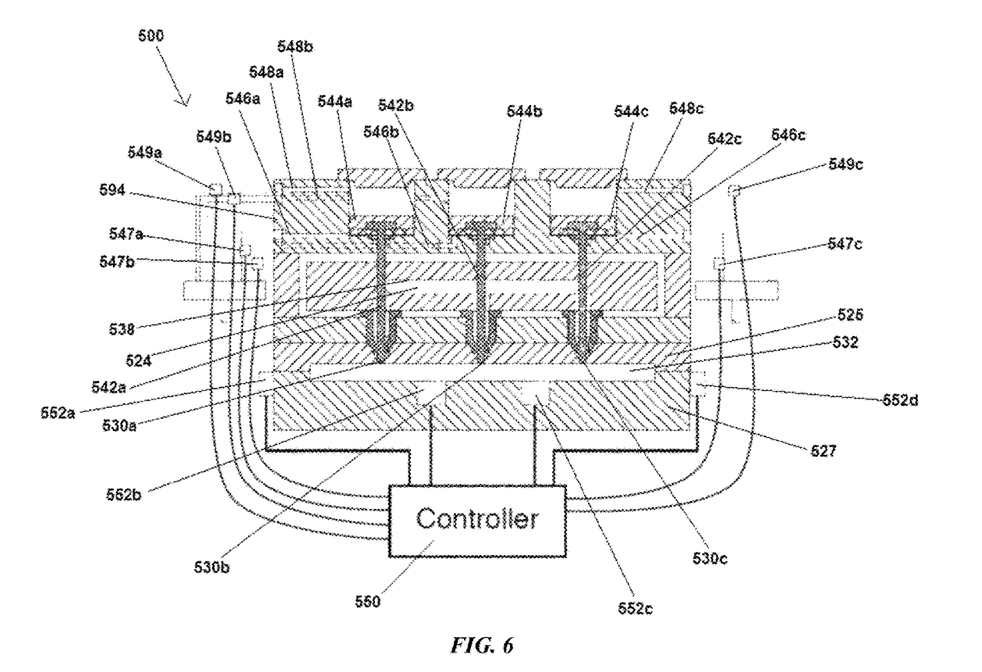
FIG. 6 is a cross-sectional view of a sequential valve gate molding system.

FIG. 6 depicts a sequential valve gate molding apparatus 510 having three valve gates 530a, 530b, and 530c leading into a mold cavity 532 formed between a first mold side 525 that is stationary and a second mold side 527 that is movable relative to the first mold side 525. Molten polymeric material 524 flows into the mold cavity 532 through hot runners 538. Valve pins 542a, 542b, and 542c alternately open and close valve gates 530a, 530b, and 530c in response to being acted upon by valve pistons 544a, 544b, and 544c. FIG. 6 depicts a pneumatic system, in which pistons 544a, 544b, and 544c are moved by compressed air, which moves through pathways 546a, 546b, and 546c in air manifold 594 to open the valve pistons 544a, 544b, and 544c, and through pathways 548a, 548b, and 548c in air manifold 594 to close the valve pistons 544a, 544b, and 544c. A valve 547a, 547b, and 547c is provided in pathways 546a, 546b, and 546c respectively, and a valve 549a, 549b, and 549c is provided in pathways 548a, 548b, and 548c respectively, in order to control the flow of compressed air and thereby control the movement of the valve pistons 544a, 544b, and 544c.

In FIG. 6, four strain gauges 552a, 552b, 552c, and 552d are placed on second mold side 527. The strain gauges 552a, 552b, 552c, and 552c are connected to controller 550. The measurements taken by the strain gauges 552a, 552b, 552c, and 552c can be used to optimize the flow of molten thermoplastic material 524 through the mold cavity 532. In comparing the strain measurements from the strain gauges 552a, 552b, 552c, and 552c to a target strain profile, such as that shown in FIG. 3, the controller may take into consideration the location of the strain gauges 552a, 552b, 552c, and 552c relative to the valve gates 530a, 530b, and 530c. For example, if the valve gates 530a, 530b, and 530c are opened in sequential order in the molding process, strain gauges 552a and 552b may provide more reliable measurements regarding the initial filling of the mod cavity 532 since they are closer to valve gate 530a and may specifically be used to control the piston 544a in valve gate 530a. Likewise, strain gauges 552b and 552c may provide more reliable measurements regarding the fill near valve gate 530b and may be specifically used to control the piston 542b in valve gate 530b. Finally, strain gauges 552c and 552d may provide more reliable measurements regarding the end of the fill near valve gate 530c and may be used to control the piston 542c in valve gate 530c.

Figure 7:
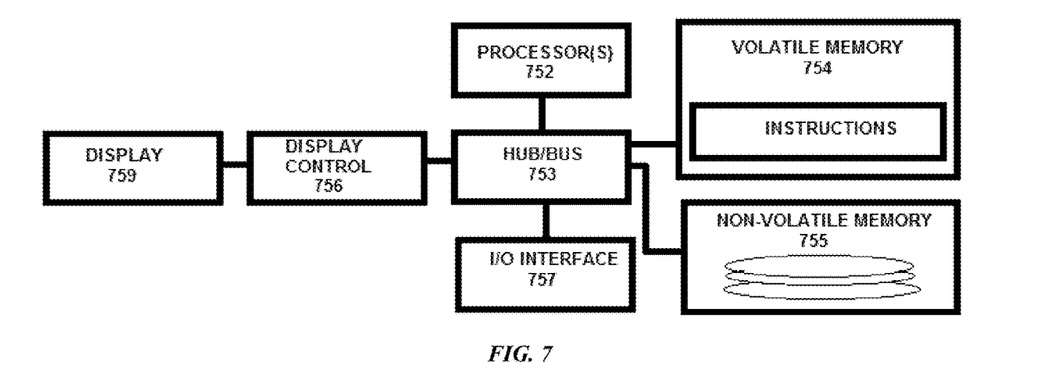
FIG. 7 is a block diagram of an example virtual cavity sensor that may be utilized in a molding system.

FIG. 7 illustrates a block diagram of an example virtual cavity sensor 740 (such as virtual cavity sensor 51) that may be utilized in a molding system. The virtual cavity sensor 740 may include, for example, one more central processing units (CPUs) or processors 752, and one or more busses or hubs 753 that connect the processor(s) 752 to other elements of the virtual cavity sensor 740, such as a volatile memory 754, a non-volatile memory 755, a display controller 756, and an I/O interface 757. The volatile memory 754 and the non-volatile memory 755 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 754 and/or the memory 755 may store instructions 758 that are executable by the processor 752. For example, in a molding apparatus particularly configured to perform the techniques described herein, the instructions may be the instructions executed by the virtual cavity sensor 740. In some embodiments, the virtual cavity sensor 740 may also perform any number of actions described herein with respect to a controller, such as the controller 50. In these embodiments, the instructions stored in the memories 754 and 755 may also include instructions to perform the actions described with respect to the controller. Accordingly, any reference to a controller being a distinct entity from a virtual cavity sensor is done for ease of explanation, and does not require the implementation of two distinct hardware modules.

The illustrated virtual cavity sensor 740 is only one example of a virtual cavity sensor suitable to be particularly configured for use in a molding apparatus. Other embodiments of the virtual cavity sensor 740 may also be particularly configured for use in a molding apparatus, even if the other embodiments have additional, fewer, or alternative components than shown in FIG. 7, have one or more combined components, or have a different configuration or arrangement of the components. Moreover, the various components shown in FIG. 7 can be implemented in hardware, a processor executing software instructions, or a combination of both hardware and a processor executing software instructions, including one or more signal processing and/or application specific integrated circuits.

Figure 8:
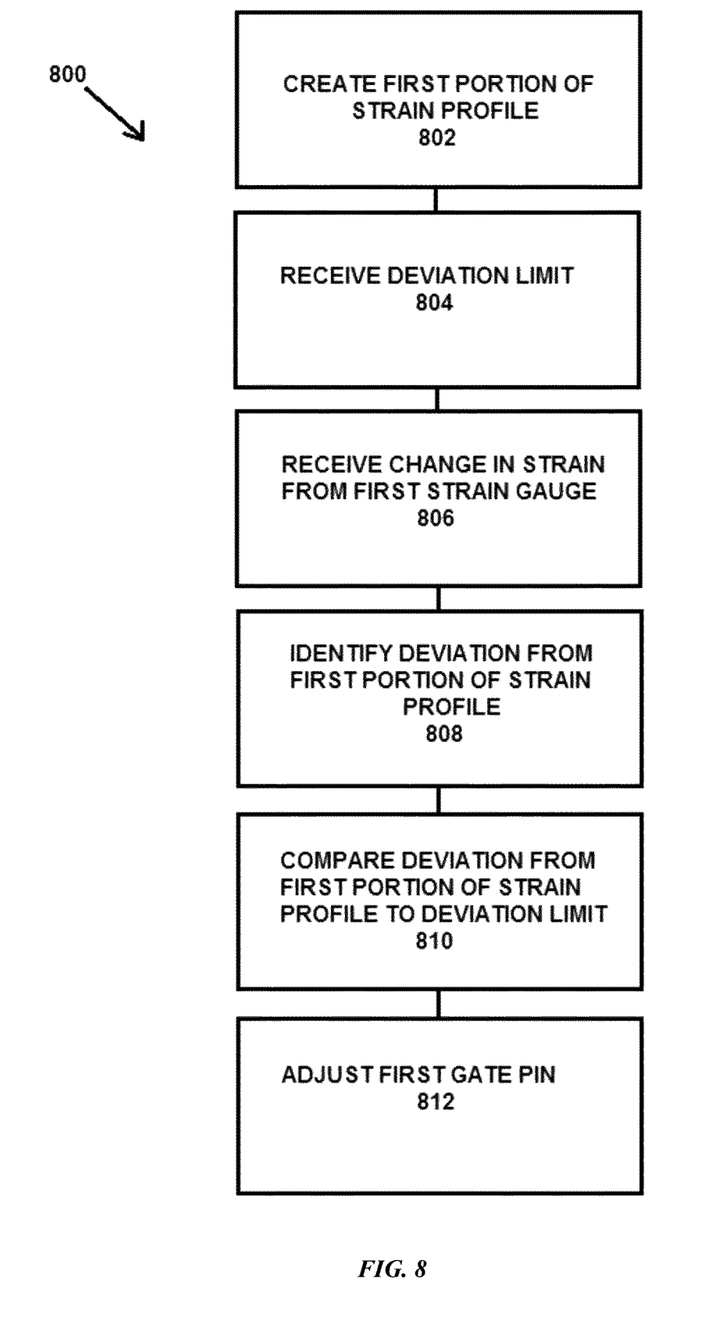
FIG. 8 is a flow diagram of an example method of monitoring and controlling a sequential valve gate molding apparatus.

FIG. 8 illustrates a block diagram of a method 800 of monitoring and controlling a sequential molding apparatus, or alternately processor-executable instructions, that, when executed, cause one or more processors to perform the actions listed. Box 802 illustrates creating, by one or more processors, a target strain profile for a sequential valve gate molding process of a sequential valve gate molding apparatus, wherein the target strain profile has at least a first portion relating to opening of a first valve gate. Box 804 illustrates receiving, via an interface, an upper deviation limit and a lower deviation limit for the sequential valve gate molding process. Box 806 illustrates receiving, as an output from a first strain gauge, a change in strain in the sequential valve gate molding apparatus relating to the first valve gate. Box 808 illustrates identifying, by the one or more processors, whether a deviation from the first portion of the target strain profile exists based on the sensed change in strain provided as the output from the first strain gauge. Box 810 illustrates, when a deviation from the first portion exists, comparing, by the one or more processors, the deviation from the first portion to the upper deviation limit or the lower deviation limit. Box 812 illustrates, when the deviation from the first portion exceeds the upper deviation limit or the lower deviation limit, adjusting a position of a first valve gate piston, thereby adjusting the position of a first valve gate pin in the first valve gate.

Figure 9:
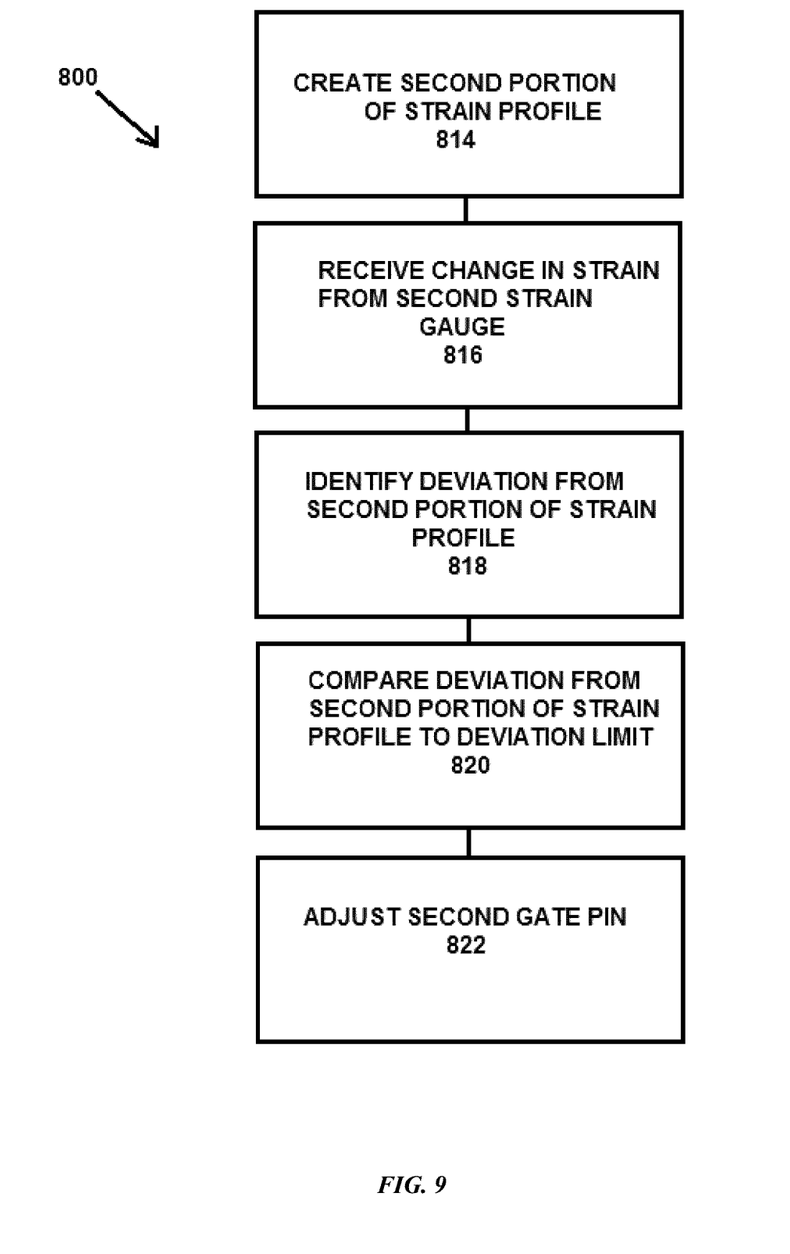
FIG. 9 is a flow diagram of additional optional steps in the example method of monitoring and controlling a sequential valve gate molding apparatus depicted in FIG. 8.

FIG. 9 illustrates a block diagram of additional optional steps in a method 800 of monitoring and controlling a sequential molding apparatus, or alternately additional processor-executable instructions, that, when executed, cause one or more processors to perform the actions listed. Box 814 illustrates creating, by one or more processors, a second portion of the target strain profile relating to opening of a second valve gate. Box 816 illustrates receiving, as an output from a second strain gauge, a change in strain in the sequential valve gate molding apparatus relating to the second valve gate. Box 818 illustrates identifying, by the one or more processors, whether a deviation from the second portion of the target strain profile exists based on the sensed change in strain provided as the output from the second strain gauge. Box 820 illustrates, when a deviation from the second portion exists, comparing, by the one or more processors, the deviation from the second portion to the upper deviation limit or the lower deviation limit. Box 822 illustrates, when the deviation from the second portion exceeds the upper deviation limit or the lower deviation limit, adjusting a flow of air through at least one of an opening pathway and a closing pathway to adjust a position of a second valve gate piston and thereby adjust the position of a second valve gate pin in the second valve gate.

While specific embodiments have been described herein, variations may be made to the described embodiments that are still considered within the scope of the appended claims.

What is claimed is:

1. A method of monitoring and controlling a sequential valve gate molding apparatus comprising:
    creating, by one or more processors, a target strain profile for a sequential valve gate molding process of a sequential valve gate molding apparatus, wherein the target strain profile has at least a first portion relating to opening of a first valve gate;
    receiving, via an interface, an upper deviation limit and a lower deviation limit for the sequential valve gate molding process;
    receiving, as an output from a first strain gauge aligned with a parting line of a mold along an edge of a mold side, a change in strain in the sequential valve gate molding apparatus relating to the first valve gate;
    identifying, by the one or more processors, whether a deviation from the first portion of the target strain profile exists based on the sensed change in strain provided as the output from the first strain gauge;
    when a deviation from the first portion is identified, comparing, by the one or more processors, the deviation from the first portion to the upper deviation limit or the lower deviation limit; and
    when the deviation from the first portion exceeds the upper deviation limit or the lower deviation limit, adjusting a position of a first valve gate piston, thereby adjusting the position of a first valve gate pin in the first valve gate.

2. The method of monitoring and controlling a sequential valve gate molding apparatus of claim 1, further comprising:
    creating, by one or more processors, a second portion of the target strain profile relating to opening of a second valve gate;
    receiving, as an output from a second strain gauge, a change in strain in the sequential valve gate molding apparatus relating to the second valve gate;
    identifying, by the one or more processors, whether a deviation from the second portion of the target strain profile exists based on the sensed change in strain provided as the output from the second strain gauge;
    when a deviation from the second portion is identified, comparing, by the one or more processors, the deviation from the second portion to the upper deviation limit or the lower deviation limit; and when the deviation from the second portion exceeds the upper deviation limit or the lower deviation limit, adjusting a flow of air through at least one of an opening pathway and a closing pathway to adjust a position of a second valve gate piston and thereby adjust the position of a second valve gate pin in the second valve gate.

3. The method of monitoring and controlling a sequential valve gate molding apparatus of claim 1, wherein the first strain gauge is located on an outside surface of the mold.

4. The method of monitoring and controlling a sequential valve gate molding apparatus of claim 1, wherein the first strain gauge is a strain pin installed on a cavity block outside the molding surface.

5. The method of monitoring and controlling a sequential valve gate molding apparatus of claim 1, and determining the position of the first valve gate pin based on a comparison of the sensed change in strain provided as the output from the first strain gauge to the first portion of the target strain profile.

6. The method of monitoring and controlling a sequential valve gate molding apparatus of claim 1, and:
receiving, as an output from a supplemental strain gauge, a supplemental change in strain in the sequential valve gate molding apparatus relating to the first valve gate; and
identifying, by the one or more processors, whether the deviation from the first portion of the target strain profile exists based on the sensed change in strain provided as the output from the first strain gauge and the supplemental sensed change in strain provided by the as the output from the supplemental strain gauge.

7. The method of monitoring and controlling a sequential valve gate molding apparatus of claim 2, and
receiving, as an output from the second strain gauge, a supplemental change in strain in the sequential valve gate molding apparatus relating to the first valve gate; and
identifying, by the one or more processors, whether the deviation from the first portion of the target strain profile exists based on the sensed change in strain provided as the output from the first strain gauge and the supplemental sensed change in strain provided by the as the output from the second strain gauge.

8. The method of monitoring and controlling a sequential valve gate molding apparatus of claim 1, wherein adjusting the position of the first valve gate piston, thereby adjusting the position of the first valve gate pin in the first valve gate, includes adjusting a flow of air through at least one of an opening pathway and a closing pathway.

9. The method of monitoring and controlling a sequential valve gate molding apparatus of claim 1, wherein adjusting the position of the first valve gate piston, thereby adjusting the position of the first valve gate pin in the first valve gate, includes adjusting output by a servomotor.

10. The method of monitoring and controlling a sequential valve gate molding apparatus of claim 2, wherein adjusting the position of the second valve gate piston, thereby adjusting the position of the second valve gate pin in the second valve gate, includes adjusting a flow of air through at least one of an opening pathway and a closing pathway.

11. The method of monitoring and controlling a sequential valve gate molding apparatus of claim 2, wherein adjusting the position of the second valve gate piston, thereby adjusting the position of the second valve gate pin in the second valve gate, includes adjusting output by a servomotor.

12. A non-transitory computer-readable storage medium storing processor-executable instructions that, when executed, cause one or more processors to:
create a target strain profile for a sequential valve gate molding process of a sequential valve gate molding apparatus, wherein the target strain profile has at least a first portion relating to opening of a first valve gate;
receive, via an interface, an upper deviation limit and a lower deviation limit for the sequential valve gate molding process;
receive, as an output from a first strain gauge aligned with a parting line of a mold along an edge of a mold side, a change in strain in the sequential valve gate molding apparatus relating to the first valve gate;
identify whether a deviation from the first portion of the target strain profile exists based on the sensed change in strain provided as the output from the first strain gauge;
when a deviation from the first portion is identified, compare the deviation from the first portion to the upper deviation limit or the lower deviation limit; and
when the deviation from the first portion exceeds the upper deviation limit or the lower deviation limit, adjust a position of a first valve gate piston, thereby adjusting the position of a first valve gate pin in the first valve gate.

13. The non-transitory computer-readable storage medium storing processor-executable instructions of claim 12, wherein the processor-executable instructions, when executed, further cause the one or more processors to:
create a second portion of the target strain profile relating to opening of a second valve gate;
receive, as an output from a second strain gauge, a change in strain in the sequential valve gate molding apparatus relating to the second valve gate;
identify whether a deviation from the second portion of the target strain profile exists based on the sensed change in strain provided as the output from the second strain gauge;
when a deviation from the second portion is identified, compare the deviation from the second portion to the upper deviation limit or the lower deviation limit; and
when the deviation from the second portion exceeds the upper deviation limit or the lower deviation limit, adjust a flow of air through at least one of an opening pathway and a closing pathway to adjust a position of a second valve gate piston and thereby adjust the position of a second valve gate pin in the second valve gate.

14. The non-transitory computer-readable storage medium storing processor-executable instructions of claim 12, wherein the processor-executable instructions, when executed, cause the one or more processors to:
determine the position of the first valve gate pin based on a comparison of the sensed change in strain provided as the output from the first strain gauge to the first portion of the target strain profile.

15. The non-transitory computer-readable storage medium storing processor-executable instructions of claim 12, wherein the processor-executable instructions, when executed, cause the one or more processors to:
receive, as an output from a supplemental strain gauge, a supplemental change in strain in the sequential valve gate molding apparatus relating to the first valve gate; and
identify, by the one or more processors, whether the deviation from the first portion of the target strain profile exists based on the sensed change in strain provided as the output from the first strain gauge and the supplemental sensed change in strain provided by the as the output from the supplemental strain gauge.

16. The non-transitory computer-readable storage medium storing processor-executable instructions of claim 13, wherein the processor-executable instructions, when executed, cause the one or more processors to:
receive, as an output from the second strain gauge, a supplemental change in strain in the sequential valve gate molding apparatus relating to the first valve gate; and
identify, by the one or more processors, whether the deviation from the first portion of the target strain profile exists based on the sensed change in strain provided as the output from the first strain gauge and the supplemental sensed change in strain provided by the as the output from the second strain gauge.

17. The non-transitory computer-readable storage medium storing processor-executable instructions of claim 12, wherein the processor-executable instructions, when executed, cause the one or more processors to:
adjust a flow of air through at least one of an opening pathway and a closing pathway in order to adjust the position of the first valve gate piston, thereby adjusting the position of the first valve gate pin in the first valve gate.

18. The non-transitory computer-readable storage medium storing processor-executable instructions of claim 12, wherein the processor-executable instructions, when executed, cause the one or more processors to:
adjust output by a servomotor in order to adjust the position of the first valve gate piston, thereby adjusting the position of the first valve gate pin in the first valve gate.

19. The non-transitory computer-readable storage medium storing processor-executable instructions of claim 13, wherein the processor-executable instructions, when executed, cause the one or more processors to:
adjust a flow of air through at least one of an opening pathway and a closing pathway in order to adjust the position of the second valve gate piston, thereby adjusting the position of the second valve gate pin in the second valve gate.

20. The non-transitory computer-readable storage medium storing processor-executable instructions of claim 13, wherein the processor-executable instructions, when executed, cause the one or more processors to:
adjust output by a servomotor in order to adjust the position of the second valve gate piston, thereby adjusting the position of the second valve gate pin in the second valve gate.

21. A client device comprising one or more processors, one or more interfaces, and a non-transitory computer-readable memory storing thereon instructions that, when executed by the one or more processors, cause the client device to:
create a target strain profile for a sequential valve gate molding process of a sequential valve gate molding apparatus, wherein the target strain profile has at least a first portion relating to opening of a first valve gate;
receive, via an interface, an upper deviation limit and a lower deviation limit for the sequential valve gate molding process;
receive, as an output from a first strain gauge aligned with a parting line of a mold along an edge of a mold side, a change in strain in the sequential valve gate molding apparatus relating to the first valve gate;
identify whether a deviation from the first portion of the target strain profile exists based on the sensed change in strain provided as the output from the first strain gauge;
when a deviation from the first portion is identified, compare the deviation from the first portion to the upper deviation limit or the lower deviation limit; and
when the deviation from the first portion exceeds the upper deviation limit or the lower deviation limit, adjust a position of a first valve gate piston, thereby adjusting the position of a first valve gate pin in the first valve gate.

22. The client device of claim 21, wherein the instructions, when executed by the one or more processors, cause the client device to:
create a second portion of the target strain profile relating to opening of a second valve gate;
receive, as an output from a second strain gauge, a change in strain in the sequential valve gate molding apparatus relating to the second valve gate;
identify whether a deviation from the second portion of the target strain profile exists based on the sensed change in strain provided as the output from the second strain gauge;
when a deviation from the second portion is identified, compare the deviation from the second portion to the upper deviation limit or the lower deviation limit; and
when the deviation from the second portion exceeds the upper deviation limit or the lower deviation limit, adjust a flow of air through at least one of an opening pathway and a closing pathway to adjust a position of a second valve gate piston and thereby adjust the position of a second valve gate pin in the second valve gate.

23. The client device of claim 21, wherein the instructions, when executed by the one or more processors, cause the client device to:
determine the position of the first valve gate pin based on a comparison of the sensed change in strain provided as the output from the first strain gauge to the first portion of the target strain profile.

24. The client device of claim 21, wherein the instructions, when executed by the one or more processors, cause the client device to:
receive, as an output from a supplemental strain gauge, a supplemental change in strain in the sequential valve gate molding apparatus relating to the first valve gate; and
identify, by the one or more processors, whether the deviation from the first portion of the target strain profile exists based on the sensed change in strain provided as the output from the first strain gauge and the supplemental sensed change in strain provided by the as the output from the supplemental strain gauge.

25. The client device of claim 22, wherein the instructions, when executed by the one or more processors, cause the client device to:
receive, as an output from the second strain gauge, a supplemental change in strain in the sequential valve gate molding apparatus relating to the first valve gate; and
identify, by the one or more processors, whether the deviation from the first portion of the target strain profile exists based on the sensed change in strain provided as the output from the first strain gauge and the supplemental sensed change in strain provided by the as the output from the second strain gauge.

26. The client device of claim 21, wherein the instructions, when executed by the one or more processors, cause the client device to:

adjust a flow of air through at least one of an opening pathway and a closing pathway in order to adjust the position of the first valve gate piston, thereby adjusting the position of the first valve gate pin in the first valve gate.

27. The client device of claim 21, wherein the instructions, when executed by the one or more processors, cause the client device to:

adjust output by a servomotor in order to adjust the position of the first valve gate piston, thereby adjusting the position of the first valve gate pin in the first valve gate.

28. The client device of claim 22, wherein the instructions, when executed by the one or more processors, cause the client device to:

adjust a flow of air through at least one of an opening pathway and a closing pathway in order to adjust the position of the second valve gate piston, thereby adjusting the position of the second valve gate pin in the second valve gate.

29. The client device of claim 21, wherein the instructions, when executed by the one or more processors, cause the client device to:

adjust output by a servomotor in order to adjust the position of the second valve gate piston, thereby adjusting the position of the second valve gate pin in the second valve gate.

* * * * *

UNITED STATES PATENT AND TRADEMARK OFFICE
CERTIFICATE OF CORRECTION

PATENT NO. : 10,894,349 B2  
APPLICATION NO. : 15/816457  
DATED : January 19, 2021  
INVENTOR(S) : William Francis Lawless, III et al.

Page 1 of 1

It is certified that error appears in the above-identified patent and that said Letters Patent is hereby corrected as shown below:

In the Claims

At Column 13, Line 23, "and:" should be -- and --.

At Column 13, Lines 32-33, "provided by the as the output" should be -- provided as the output --.

At Column 13, Lines 44-45, "provided by the as the output" should be -- provided as the output --.

At Column 15, Lines 3-4, "provided by the as the output" should be -- provided as the output --.

At Column 15, Lines 18-19, "provided by the as the output" should be -- provided as the output --.

At Column 16, Lines 55-56, "provided by the as the output" should be -- provided as the output --.

At Column 17, Lines 1-2, "provided by the as the output" should be -- provided as the output --.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*